US005089814A

United States Patent [19]

DeLuca et al.

[11] Patent Number: 5,089,814

[45] Date of Patent: Feb. 18, 1992

[54] AUTOMATIC TIME ZONE ADJUSTMENT OF PORTABLE RECEIVER

[75] Inventors: Michael J. DeLuca; Joan S. DeLuca, both of Boca Raton, Fla.

[73] Assignee: Motorola, Inc., Schaumburg, Ill.

[21] Appl. No.: 554,958

[22] Filed: Jul. 23, 1990

Related U.S. Application Data

[63] Continuation of Ser. No. 344,887, Apr. 28, 1989, abandoned.

[51] Int. Cl.5 .......................... H04Q 7/00; G08B 5/22; G04C 11/00

[52] U.S. Cl. .......................... 340/825.49; 340/825.44; 368/21; 368/47

[58] Field of Search ........... 340/825.44, 311.1, 825.26, 340/825.47, 825.48, 825.49, 825.04; 368/47, 21, 22, 23; 455/181

[56] References Cited

U.S. PATENT DOCUMENTS 4,313,186 1/1982 Yoshida ................................ 368/22
4,315,332 2/1982 Sakami et al. ....................... 455/181
4,435,086 3/1984 Kato ..................................... 368/22
4,644,347 2/1987 Lucas et al. .................... 340/825.04
4,650,344 3/1987 Allgaier et al. ...................... 368/47
4,681,460 7/1987 Nishimura ............................ 368/22
4,713,808 12/1987 Gaskill et al. ........................ 370/93
4,823,328 4/1989 Conklin et al. ....................... 368/47
4,845,491 7/1989 Fascenda et al. ............. 340/825.47
4,884,254 11/1989 Kawai et al. .......................... 368/21

OTHER PUBLICATIONS

Webster's New World Dictionary of American English, Copyright 1988, 3rd College Edition, Victoria Neufeldt (Editor), p. 710.

*Primary Examiner*—Donald J. Yusko
*Assistant Examiner*—Peter Weissman
*Attorney, Agent, or Firm*—Daniel R. Collopy; Vincent B. Ingrassia; William E. Koch

[57] ABSTRACT

A portable receiver has a time of day clock and receives a signal indicative of the location of the portable receiver. The portable receiver has a memory which has a plurality of locations with corresponding time zones. Upon reception of the location signal, the receiver determines the time zone of the location and the time zone of the time of day clock. The time of day clock is then adjusted to correspond to the time zone of the location. The location signal may also be used to adjust the operating frequency of the receiver.

16 Claims, 2 Drawing Sheets

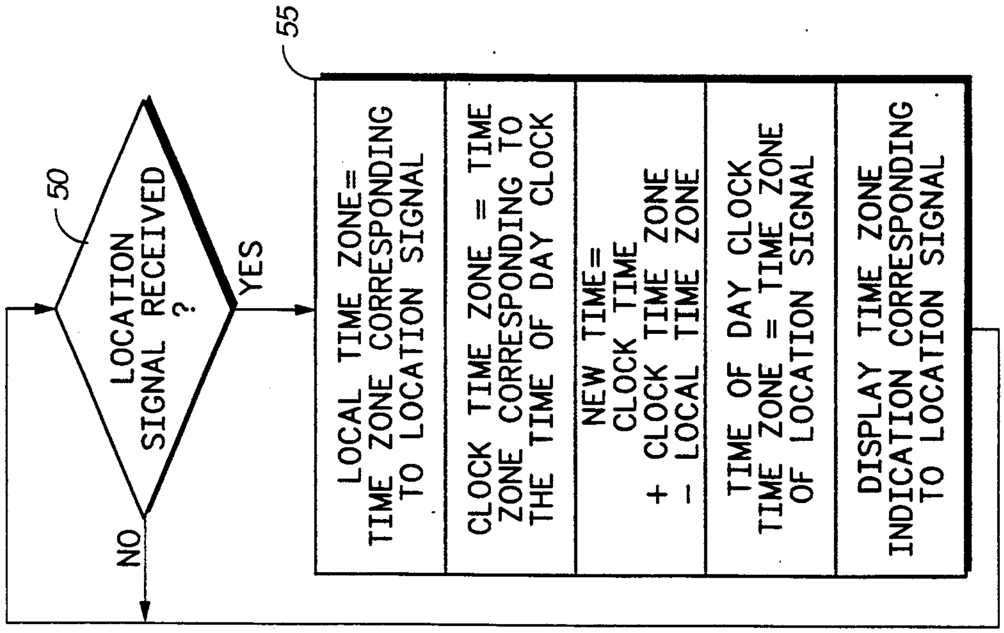
*FIG.2*
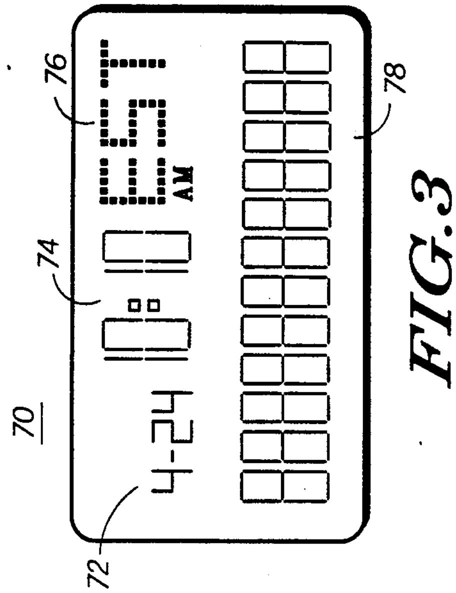
*FIG.3*
60
| LOCATION | TIME ZONE | INDICATION |
|---|---|---|
| BOCA RATON, FL. | +5:00 | EST |
| WASHINGTON, DC. | +5:00 | EST |
| SCHAUMBURG, IL. | +6:00 | CST |
| KEYSTONE, CO. | +7:00 | MST |
| PHOENIX, AZ. | +7:00 | MST |
| LOS ANGLES, CA. | +8:00 | PST |
| TOKYO, JAPAN | -9:00 | JAP |
| CARACAS, VENEZUELA | +3:30 | VEN |
*FIG.4*

AUTOMATIC TIME ZONE ADJUSTMENT OF PORTABLE RECEIVER

This is a continuation of application Ser. No. 344,887, filed Apr. 28, 1989, now abandoned.

BACKGROUND OF THE INVENTION

This invention relates generally to the area of portable receivers with time of day clocks. In particular this invention relates to a portable receiver receiving a signal indicating a location, the portable receiver determining a time zone corresponding to the location and adjusting the time of day clock in response thereto.

The features of portable receivers such as paging receivers have expanded to include time of day clocks. Additionally, the use of paging receivers within nation wide systems having location signals has become a valuable tool for the traveling business person. As the traveling business person travels between time zones, the time displayed on the clock must be adjusted. This constant adjustment in the course of traveling can become a tedious operation, and if neglected can result in disastrous conclusions. A business person using a clock hours away from the correct time can miss scheduled appointments.

Prior art paging systems which transmit time of day information suffer from several problems. First, a pager entering a new time zone resets its clock to correspond to the time of day signal of the new time zone. However, a person cannot choose to operate their clock several minutes fast as many people desire. Second, in order to transmit the time of day signal, transmitters must be able to guarantee that the transmission of the time of day signal is in coincidence with the accurate time of day. This can become an enormous problem when retrofitting the time signals into the existing queuing structure for messages within a paging terminal. Third, the time of day signals consume valuable information channel capacity which could otherwise be used for the transmission of paging messages. And fourth, the time signal must be transmitted in every location that the business person travels. This can be a difficult requirement to impose on nation wide systems operating in conjunction with independently operated local paging systems.

SUMMARY OF THE INVENTION

It is therefore an object of the present invention to alleviate the aforementioned problems.

It is an object of the present invention to provide for the automatic correction of the time zone of a receiver having a time of day clock without the necessity of a time of day signal.

It is an object of the present invention to adjust the time of day clock for the proper time zone in response to determining the location of the time of day clock and determining the time zone corresponding to the location.

It is yet another object of the present invention to display the time zone in which a receiver operates.

In accordance with the present invention, a portable receiver comprises a receiving means receiving a location signal, the location signal being indicative of a location, a time keeping means for keeping time of day, and an adjusting means responsive to the location signal for adjusting said time keeping means.

BRIEF DESCRIPTION OF THE DRAWINGS

This invention can be more fully understood from the following detailed description when taken in conjunction with the accompanying drawings.

FIG. 2 shows a flowchart of the adjustment of a time of day clock in accordance with the present invention.

FIG. 3 shows an example of a display on a paging receiver operating in accordance with the present invention.

FIG. 4 shows an example of a lookup table for storage in the memory means of FIG. 1 in accordance with the present invention.

DESCRIPTION OF A PREFERRED EMBODIMENT

Figure 1:
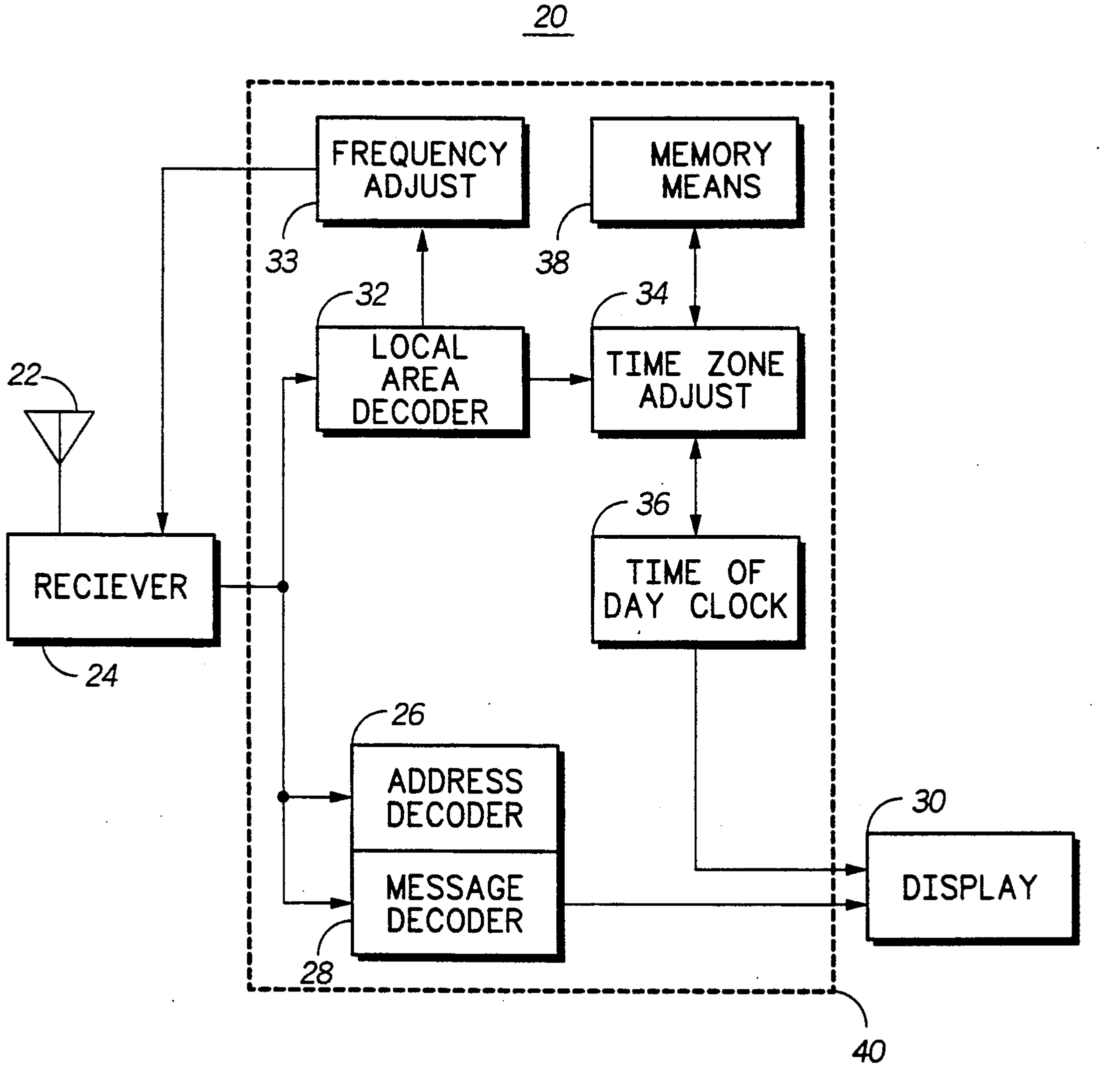
FIG. 1 shows a block diagram of a paging receiver which operates in accordance with the present invention

FIG. 1 shows a block diagram of a paging receiver 20 which operates in accordance with the present invention. The paging receiver receives a signal having a location signal included therein. The location signal includes the location of the city or locality in which the paging receiver is operating. An enabling description of such a pager is included within U.S. Pat. No. 4,644,347 to Lucas et al. which is hereby incorporated by reference. The paging receiver additionally has a time of day clock, and an enabling description of a paging receiver having a time of day clock is included in allowed U.S. Pat. No. 4,860,005 to DeLuca et al., which is also hereby incorporated by reference.

The paging signal is collected by antenna 22 and demodulated by receiver 24. The demodulated paging signal is processed by an address decoding means 26 which searches for an address signal matching a predetermined address signal assigned to the pager. In response to the detection of the address, message decoding means 28, decodes information associated with the address. The address and information comprise a message which may be displayed on a display means 30 in a known manner.

The demodulated information is also processed by a means for detecting the location signal 32. The location signal identifying a city or locality may be included within a unique preamble signal, a unique start code (SC), or location of a unique binary word appended within the preamble signal. The local area decoder 32 and the receiver 24 operate as a receiving means receiving for a location signal. The location signal may be made available to a frequency adjusting means 33 which adjusts the receive frequency of receiver 24 to correspond to the proper local frequency, as described in the aforementioned Lucas et al. patent. The location signal is also made available to time zone adjusting means 34 which adjusts the time of day clock 36 in response to the location signal and on the basis of information included within a memory means 38.

It should be appreciated that address decoder 26, message decoder 28, local area decoder 32, adjusting means 34, time keeping means 36 and memory means 38 may be implemented within a host microcomputer 40. A preferred host microcomputer 40 for the present invention is the Motorola MC68HC05L6 microcomputer. This microcomputer 40 combined with the references and description incorporated herein provides an enabling description of the invention.

FIG. 2 shows a flowchart of the adjustment of a time of day clock in accordance with the present invention. First, step 50 checks if a location signal has been received by local area detector 32. If received, step 55 performs a series of operations in order to adjust the time of day clock 36. First, the local time zone value is set to be equal to the time zone corresponding to the location signal just received. Then the clock time zone is set to be equal to the time zone corresponding to the time zone of the time of day clock. A new time is calculated by adding the clock time and the clock time zone while subtracting the local time zone. Table 60 shows a table of location signals and time zones which are stored in memory means 38. Then the time zone of the time of day clock is set to correspond to the location signal and finally an indicator indicative of the time zone of the location signal is displayed on display 30. The indicator is additionally shown in table 60 (FIG. 4).

FIG. 3 shows an example of a display on a paging receiver operating in accordance with the present invention. The display 70 includes date information 72 which is shown to be "April 24", time of day information 74 which is shown to be "10:10 AM", and 0 time zone information 76 which is shown to be "EST" representing Eastern Standard Time. Additionally, numeric message information display 78 is provided for displaying messages received by the pager. It should be appreciated that information display could additionally display alpha or graphic information, and that the information of 72, 74, and 76 could be displayed on 78 in the absence of message information thereby providing for the elimination of display segments dedicated to the functions of 72, 74 and 76, and thus providing for a smaller display.

One example of the operation of the present invention, shown in the table of FIG. 4, is a traveling business person traveling from Washington, D.C. to Los Angeles. While in Washington, D.C., the pager received a location signal indicating that Washington, D.C. was the location of the paging receiver, in response to which the pager displays the local time, date and "EST" indicating Eastern Standard Time. Upon arrival at Los Angeles the pager receives a new location signal indicating that Los Angeles is the location of the paging receiver. Assuming the first Los Angeles location signal was received at 10:10 AM EST, the following steps, in accordance with step 55, would be taken. The pager would determine that the location of Los Angeles corresponds to a time zone of "+8" according to table 60. The pager would similarly determine the time of day clock was operating on EST which corresponds to a time zone of "+5" and the following calculation would be made:

| | |
|---|---|
| CURRENT TIME | 10:10 AM |
| CLOCK TIME ZONE | +5:00 |
| LOCAL TIME ZONE | −(+8:00) |
| NEW TIME | 7:10 AM |

Additionally, the indication "PST" corresponding to Pacific Standard Time would be displayed in accordance with table 60. In can also be appreciated that a person traveling from Boca Raton, Fla. to Washington, D.C. remains in the same time zone and the pager operating in accordance with the present invention would remain displaying the same time zone even though the location signal had changed while traveling.

It can be further appreciated that if the change in time zones cause the time of day to advance or retard to the next or previous day respectively, the date could be adjusted correspondingly. Furthermore, if time zones such as Caracas which according to table 60 cause the minutes to be adjusted, were eliminated, only the hours of the time of day clock need to be adjusted, thereby reducing the complexity of the adjusting means.

The advantage of using the location signal to set the time zone is that the location signal is already being transmitted and used for nation wide pagers in order that they may select a local channel, as described in Lucas et al. No additional time of day signal needs to be transmitted in order to adjust for travel between time zones. This resolves a number of queueing issues involved with paging transmitter systems as well as eliminating the air time required to transmit time of day signals. This additionally allows the time of day clock to be set to operate ahead of (or behind) the true time of day in a first location and preserving the setting as the time zones are traversed.

It is obvious that numerous additional modifications and variations of the present invention are possible in light of the above teachings. It is therefore to be understood that within the scope of the appended claims, the invention may be practised otherwise than as specifically described herein.

What is claimed is:

1. A portable receiver for receiving radio frequency (RF) signals on at least two frequencies, the portable receiver comprising:

receiving means for receiving the signals, the signals comprising a periodically transmitted location signal, the location signal comprising one of a plurality of geographic identification signals, each of said plurality of geographic identification signals uniquely identifying a geographic location corresponding to a local area RF signalling system transmitting the signals;

decoding means for decoding the location signal;

memory means for storing at least one predetermined location signal;

frequency adjusting means coupled to said receiving means for selecting a first of said at least two frequencies in response to said decoded location signal not being equivalent to any of said at least one predetermined location signal and for selecting one of said at least two frequencies other than said first of said at least two frequencies in response to said decoded location signal being equivalent to one of said at least one predetermined location signal;

time keeping means for keeping time of day; and time adjusting means for adjusting said time keeping means to the time of day corresponding to the geographic location of said local area RF signalling system in response to the decoded location signal matching one of said at least one predetermined location signal and for not adjusting said time keeping means to the time of day corresponding to the geographic location of said local area RF signalling system in response to the decoded location signal not matching any of said at least one predetermined location signal.

2. The portable receiver of claim 1 further wherein:

said time keeping means keeps the time of day in at least hours and minutes portions; and said time adjusting means adjusts the hours portion of the time keeping means.

3. The portable receiver of claim 1 wherein said time adjusting means comprises:

means for determining a first time adjustment corresponding to the decoded location signal;

means for determining a second time adjustment corresponding to the time keeping means; and means for determining the difference between the first and second time adjustments; and wherein said time adjusting means adjusts said time keeping means in response to said difference.

4. The portable receiver of claim 1 wherein said memory means further stores a predetermined time adjustment corresponding to each of said at least one predetermined location signal wherein the time adjustment corresponding to the decoded location signal is determined by selecting a predetermined time adjustment corresponding to one of the at least one predetermined location signal matching the decoded location signal; and wherein said time adjusting means adjusts said time keeping means in response to said predetermined time adjustment.

5. The portable receiver of claim 4 further comprising a display means responsive to said time keeping means for displaying the time of day.

6. The portable receiver of claim 5 wherein:

said memory means further stores an indication of a time zone corresponding to each of the at least one predetermined location signal, and said display means further displays the indication corresponding to the decoded location signal.

7. The portable receiver of claim 5 wherein the location signal further comprises a message for reception by the portable receiver, the message including an address associated with the portable receiver and information associated with the message, and said receiving means further includes:

address decoding means having a predetermined address, said address decoding means for processing the location signal and determining if the address of the message matches the predetermined address and for generating a detect signal in response thereof; and information decoding means responsive to the detect signal for processing the information of the message, wherein the information of the message is displayed on said display means.

8. The portable receiver of claim 1 further wherein said time keeping means additionally includes date information wherein said time adjusting means additionally adjusts the date information in response to the decoded location signal.

9. A portable radio frequency (RF) receiver for receiving signals transmitted by a plurality of RF signalling systems, the portable RF receiver comprising:

receiving means for receiving said signals, said signals comprising a periodically transmitted location signal, the location signal comprising one of a plurality of geographic identification signals, each of said plurality of geographic identification signals transmitted by one of said plurality of RF signalling systems and uniquely identifying a said one of said plurality of RF signalling system;

decoding means for decoding the location signal;

time keeping means for keeping time of day; and time adjusting means for adjusting said time keeping means to the time of day corresponding to a geographic location of said one of said plurality of RF signalling systems in response to the decoded location signal comprising one of said plurality of geographic identification signals corresponding to said one of said plurality of RF signalling systems.

10. The portable receiver of claim 9 further wherein:

said time keeping means keeps the time of day in at least hours and minutes portions; and said time adjusting means adjusts the hours portion of the time keeping means.

11. The portable receiver of claim 9 wherein said time adjusting means comprises:

means for determining a first time adjustment corresponding to said geographic location in response to the decoded location signal;

means for determining a second time adjustment corresponding to the time keeping means; and means for determining the difference between the first and second time adjustments; and wherein said time adjusting means adjusts said time keeping means in response to said difference.

12. The portable receiver of claim 9 wherein said time adjusting means includes:

memory means having a plurality of predetermined geographic identification signals with a time adjustment corresponding to each of said plurality of predetermined geographic identification signals wherein the time adjustment corresponding to the decoded location signal is determined by selecting a time adjustment corresponding to one of the plurality of predetermined geographic identification signals matching one of the plurality of geographic identification signals comprising the decoded location signal; and wherein said time adjusting means adjusts said time keeping means in response to said one of the plurality of predetermined time adjustments.

13. The portable receiver of claim 12 further comprising a display means responsive to said time keeping means for displaying the time of day.

14. The portable receiver of claim 13 wherein:

said memory means further includes an indication of a time zone corresponding to each of the plurality of predetermined geographic identification signals and the corresponding time adjustment, and said display means further displays the indication corresponding to the one of the predetermined geographic identification signals matching the one of the plurality of geographic identification signals comprising the decoded location signal.

15. The portable receiver of claim 13 wherein the location signal further comprises a message for reception by a selective call receiver, the message including an address associated with the selective call receiver and information associated with the message, and said receiving means further includes:

address decoding means having a predetermined address, said address decoding means for processing the location signal and determining if the address of the message matches the predetermined address and for generating a detect signal in response thereof; and information decoding means responsive to the detect signal for processing the information of the message, wherein the information of the message is displayed on said display means.

16. The portable receiver of claim 9 further wherein said time keeping means additionally includes date information wherein said time adjusting means additionally adjusts the date information in response to the decoded location signal.

* * * * *